(12) United States Patent
Kohli (10) Patent No.: US 10,685,348 B2
(45) Date of Patent: Jun. 16, 2020

(54) SYSTEM AND METHOD FOR SECURED TAX REFUND FOR CROSS BORDER TRANSACTIONS WITH MOBILE DEVICE WALLET APPLICATION

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 620 days.

(21) Appl. No.: 15/378,801

(22) Filed: Dec. 14, 2016

(65) Prior Publication Data
US 2018/0165677 A1    Jun. 14, 2018

(51) Int. Cl.
| | | |
|---|---|---|
| *G06Q 20/36* | (2012.01) | |
| *G06Q 20/32* | (2012.01) | |
| *G06Q 20/10* | (2012.01) | |
| *G06Q 20/40* | (2012.01) | |
| *G06Q 20/20* | (2012.01) | |

(52) U.S. Cl.
CPC .......... *G06Q 20/36* (2013.01); *G06Q 20/10* (2013.01); *G06Q 20/207* (2013.01); *G06Q 20/322* (2013.01); *G06Q 20/3223* (2013.01); *G06Q 20/40145* (2013.01)

(58) Field of Classification Search
CPC ........ G06Q 20/10; G06Q 20/40; G06Q 30/06; G06Q 20/36; G06Q 20/3223
See application file for complete search history.

(56) References Cited

U.S. PATENT DOCUMENTS

| | | | |
|---|---|---|---|
| 7,173,532 B2* | 2/2007 | Hanle | G06Q 10/02 340/5.2 |
| 2012/0158584 A1 | 6/2012 | Behren et al. | |
| 2014/0195424 A1 | 7/2014 | Zheng et al. | |
| 2015/0106247 A1* | 4/2015 | Saft | G06Q 40/123 705/31 |

(Continued)

FOREIGN PATENT DOCUMENTS

WO    2014/132255 A1    9/2014

OTHER PUBLICATIONS

"PCT Notification of Transmittal of the International Search Report and the Written Opinion" International Searching Authority, or the Declaration, dated Dec. 15, 2017 (Dec. 15, 2017), for International Application No. PCT/US2017/058431, 14pgs.

*Primary Examiner* — Hao Fu
(74) *Attorney, Agent, or Firm* — Buckley, Maschoff & Talwalkar LLC (57) ABSTRACT

A digital wallet server computer communicates with a digital wallet application program running on a payment-enabled mobile device. The entry of the mobile device into a country that is foreign to the user's country of residence is detected. The server computer receives transaction information regarding VAT-bearing payment account transactions via the wallet application. The total amount of VAT charged to the user during a trip to the foreign country is calculated. The server computer receives an indication of the user's departure from the foreign country and then initiates a payment account credit transaction to refund the total VAT into the user's payment account.

9 Claims, 8 Drawing Sheets

(56) References Cited

U.S. PATENT DOCUMENTS

| | | |
|---|---|---|
| 2015/0127534 A1 | 5/2015 | Bhambhani |
| 2015/0254639 A1 | 9/2015 | Radu |
| 2015/0324767 A1* | 11/2015 | Walsh .................... G06Q 50/26 705/44 |
| 2016/0371438 A1* | 12/2016 | Annulis .................. G06F 21/32 |

* cited by examiner

SYSTEM AND METHOD FOR SECURED TAX REFUND FOR CROSS BORDER TRANSACTIONS WITH MOBILE DEVICE WALLET APPLICATION

BACKGROUND

Figure 1:
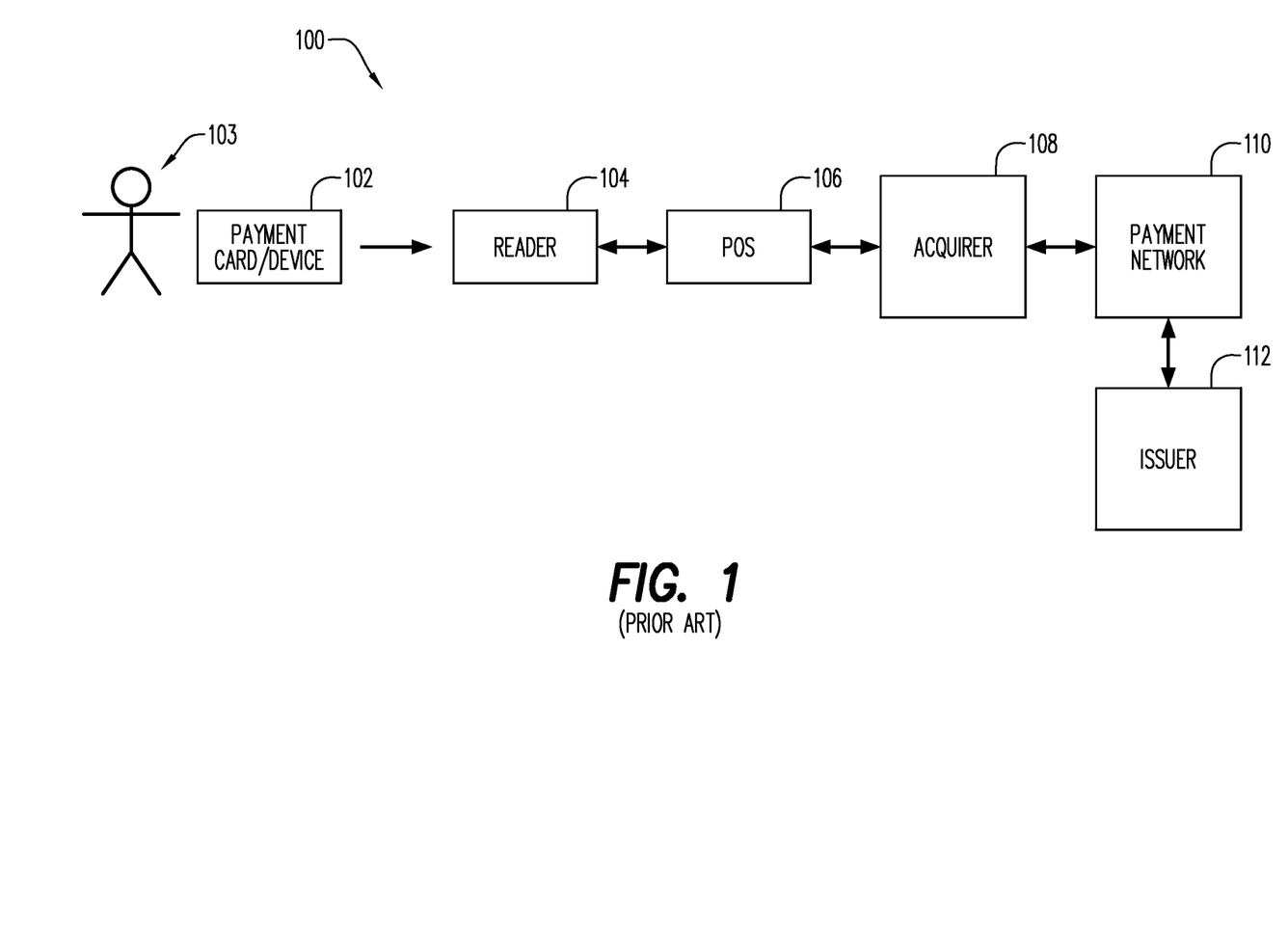
FIG. 1 is a block diagram that illustrates a conventional payment account system.

FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc. The payment card/device 102 is shown being carried and used by an account holder/user 103.

The system 100 further includes a reader component 104 associated with a POS terminal 106. In some known manner (depending on the type of the payment card/device 102) the reader component 104 is capable of reading the payment account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment account issuer server computer 112 may be operated by or on behalf of a financial institution ("FI") that issues payment accounts to individual users. For example, the payment account issuer server computer 112 may perform such functions as (a) receiving and responding to requests for authorization of payment account transactions to be charged to payment accounts issued by the FI; (b) tracking and storing transactions and maintaining account records; (c) rendering periodic account statements; and (d) receiving and tracking payments to the issuer from the account holders.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment cards or other devices for initiating payment transactions by presenting an associated payment account number to the reader component of a POS terminal.

For use-cases in which the payment card/device is embodied as a payment-enabled smartphone, the concept of a "digital wallet" has been introduced. In some implementations, the digital wallet takes the form of a payment-related application program ("app") that is downloaded to and active on the smartphone. The user is permitted to load data (and/or an account-related payment app) corresponding to a number of different payment accounts (and possibly other types of credentials as well) into the wallet app. At the point of sale, the user opens the wallet app and selects one of the associated payment accounts for use in the present transaction. Via the wallet app or (as the case may be) the selected payment app, the corresponding payment credentials may be provided to the POS terminal to initiate the payment interaction among the merchant and other components of the payment account system.

In other implementations of the digital wallet concept, the main repository of account/credential data is located in a remote server (e.g., operated by a "wallet service provider"—WSP). The user may access his/her wallet partition in the server via a suitable mobile app, or (e.g.) for online shopping via a laptop computer or PC. In something of a hybrid of the two approaches, the wallet app plays a central role, but the payment account data/payment tokens are not stored in the smartphone, but rather are made accessible at the time of the purchase transaction via interaction between the wallet app and a remote host server.

In known implementations of mobile wallet apps, access to the app is permitted only upon user authentication, as by a biometric measure. One well known biometric measure relies on a fingerprint scanner on the smartphone and verification of the user's fingerprint.

The present inventor has recognized opportunities to apply the concept of wallet apps and associated biometric user authentication to improve the convenience and security of processes involved in obtaining VAT (value added tax) refunds on purchases made by travelers outside of their home countries.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, tracking and refunding of VAT (value added tax) or the like to a traveler may be automated and simplified in a system based on a wallet app running on the traveler's smartphone. The wallet app is employed at the point of sale to engage in payment account transactions that bear VAT. The wallet app communicates with a remote digital wallet server computer, to allow the digital wallet server computer to track and accumulate the amounts of VAT payments made in the payment account transactions. When the traveler leaves the country to which VAT was paid, this circumstance is automatically detected by or communicated to the digital wallet server computer. In response, the digital wallet server computer automatically refunds the VAT paid to the traveler's payment account. Security of the system may be enhanced by requiring user authentication via fingerprint scanning to permit access to the wallet app in the smartphone.

Figure 2:
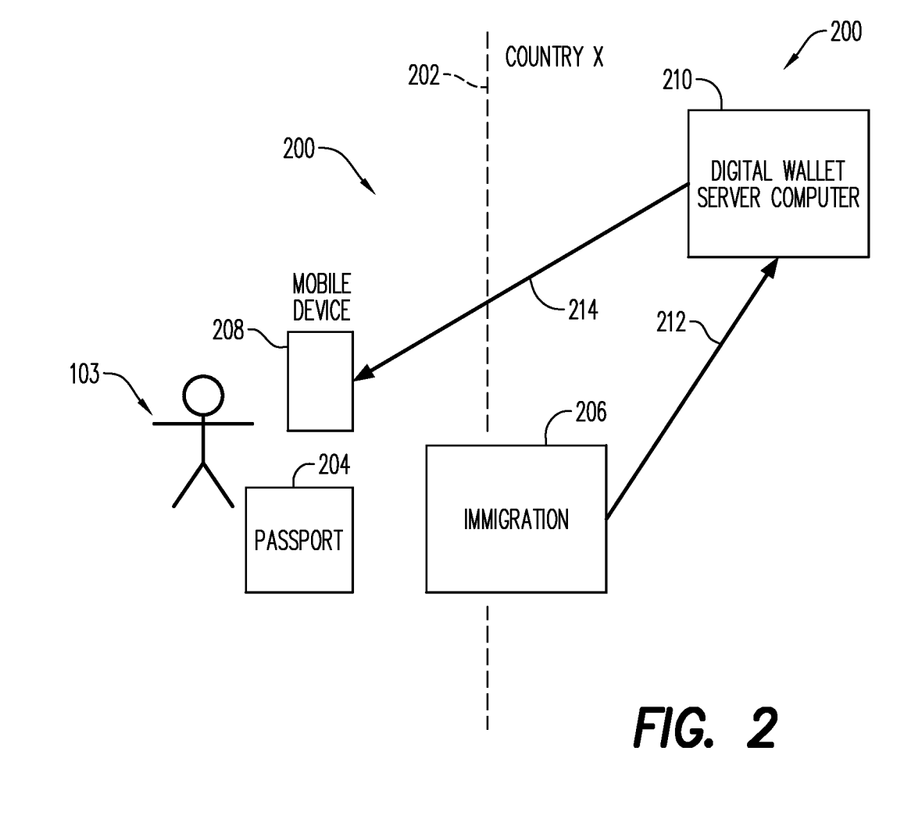
FIG. 2 is a block diagram showing aspects of a tax refund system according to some embodiments.

FIG. 2 is a block diagram showing aspects of a tax refund system 200 provided according to some embodiments.

In FIG. 2, a traveler/user 103 is shown engaging in immigration processing to permit the user to enter "Country X" (the border/point of entry for Country X is indicated at 202). It is assumed that the user 103 is a resident of a different country ("Country Y"—not shown) and is entering Country X for a fairly brief visit. The user 103 is presenting his/her passport 204 to an immigration processing authority 206 at the point of entry 202. (The user may also present a visa.) The user 103 is also assumed to be carrying a suitably programmed payment-enabled smartphone 208. Details of the smartphone 208 will be described below, including discussion below of FIG. 5.

The tax refund system 200 includes a digital wallet server computer 210. Details of the structure and functional features of the digital wallet server computer 210 will be described below. The digital wallet server computer may be located in any country, e.g., in the home country of the user, in Country X, or anywhere else in the world.

It is indicated in FIG. 2 via arrow mark 212 that the immigration processing authority 206 automatically informs the digital wallet server computer 210 that user 103 is entering Country X. This notification may, for example, follow an interaction by short-distance radio communication between the smartphone 208 and a terminal (not separately shown) operated by the immigration processing authority 206.

As indicated by arrow mark 214, the digital wallet server computer 210 may respond to the notification of the user's entry by communicating "over the air" with the payment-enabled smartphone 208 to activate a special purpose wallet app (not separately shown in FIG. 2) that had previously been downloaded to the payment-enabled smartphone 208. There will be discussion below concerning the downloading of the wallet app to the payment-enabled smartphone 208.

Figure 3:
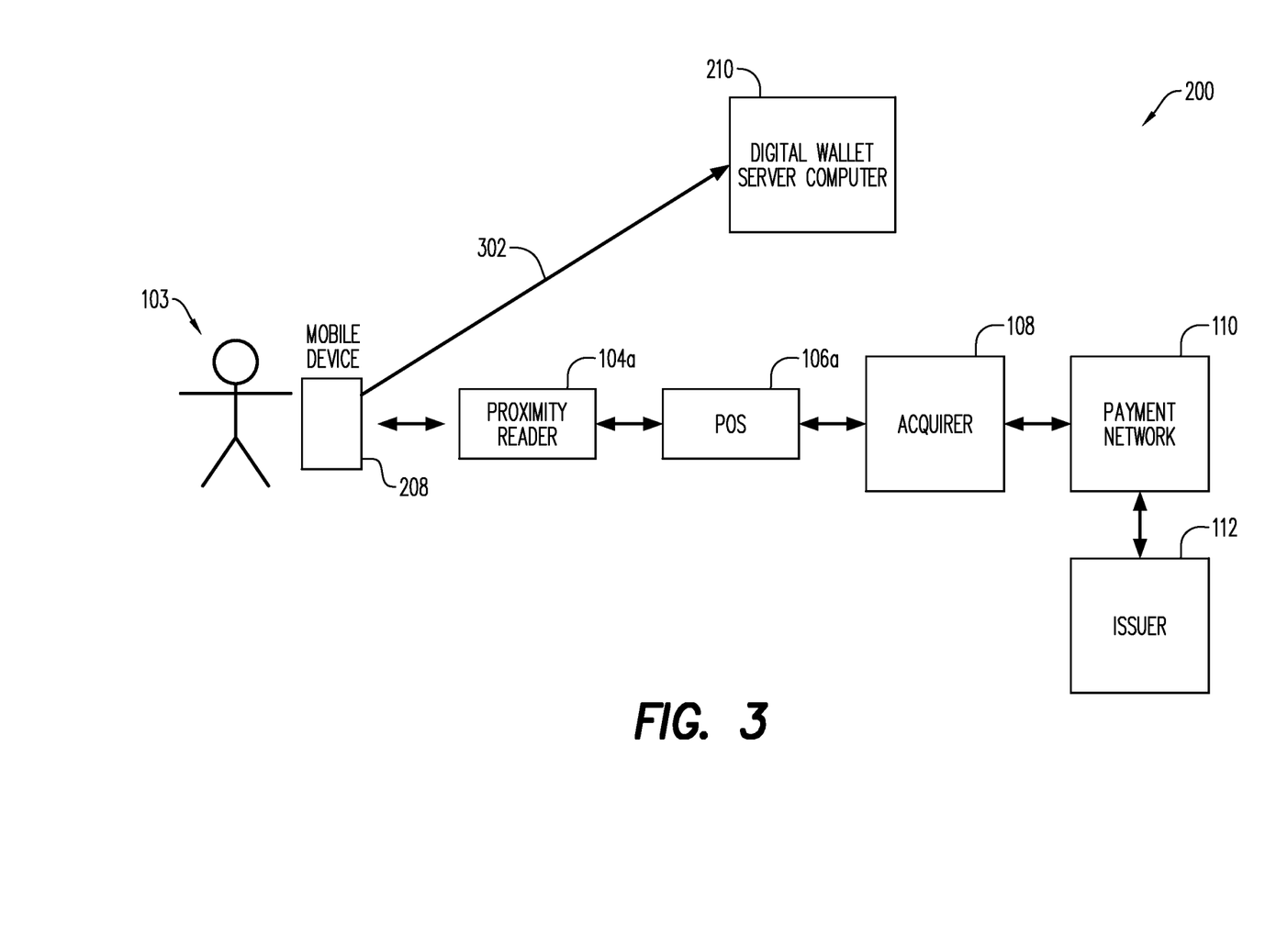
FIG. 3 is a block diagram showing further aspects of the tax refund system of FIG. 2.

FIG. 3 is a block diagram that illustrates other aspects of the tax refund system 200. In particular, FIG. 3 illustrates aspects of the tax refund system 200 concerned with a purchase transaction in which VAT is charged.

FIG. 3 incorporates elements from FIGS. 1 and 2. The digital wallet server computer 210 is shown again, as are the user 103 and the user's payment-enabled smartphone 208. The premise of FIG. 3 is that the user 103 is visiting a retail store located in Country X and making a purchase of one or more items (not shown in FIG. 3) that are subject to VAT. The user 103 is presenting the payment-enabled smartphone 208 to the merchant's proximity reading device 104a and POS terminal 106a to settle the purchase transaction via a payment account transaction. The above-mentioned wallet app (not separately shown in FIG. 3) has been invoked by the user 103 to access the payment account data corresponding to the payment account the user 103 wishes to use for the current transaction. The wallet app (or a payment app accessible by and associated with the wallet app) presents the user's selected payment credentials to the proximity reader 104a/POS terminal 106a. Those elements, as well as elements 108 (acquirer), 110 (payment network) and 112 (account issuer), may play substantially the same roles as the corresponding elements portrayed in FIG. 1 and discussed above in connection with FIG. 1. In addition, the POS terminal 106a may provide an electronic receipt (not shown) to the wallet app on the payment-enabled smartphone 208. The electronic receipt may indicate the amount of the VAT that was charged as part of the current transaction as well as other data relating to the transaction, such as item pricing and merchant's name and identifier.

As indicated by arrow mark 302 in FIG. 3, the wallet app may upload the electronic receipt over the air for storage and further processing by the digital wallet server computer 210.

In some embodiments, it may be the case that particular transactions may be evaluated to determine whether they qualify for a VAT refund. This may be done based on parsing of receipts for purchase transactions in Country X by the user. The parsing may, for example, be performed by the digital wallet server computer 210. The need for parsing and/or evaluation may arise if it is the case that not every merchant within Country X is participating in the VAT refund system or if purchases at some merchants do not qualify for VAT refund.

For example, the digital wallet server computer 210 may cooperate with a government agency or agencies of Country X to validate merchant eligibility for the VAT refund program. This may occur in various ways. For example, the government agency may provide a data feed to the digital wallet server computer 210 to be stored in a database in the digital wallet server computer 210. The digital wallet server computer 210 may perform look-ups in the database to check the merchant identifier in each transaction to confirm that the transaction should be aggregated for a VAT refund. In other embodiments, the digital wallet server computer 210 may call a government agency computer system (not shown in FIG. 3) with the merchant identifier as each transaction is received at the digital wallet server computer 210. The government agency computer system may then verify whether the identified merchant qualifies/participates in the VAT refund program. If so, then the amount of VAT paid in the transaction may be aggregated for refund upon the user's departure from Country X.

In some embodiments, for additional security, the geo-ip location of the user's mobile device 208 may be verified as being indicative of the geographic location of the merchant for the transaction to validate that the purchase is being made in Country X. (In addition or alternatively in regard to verifying the location of the mobile device 208, the location according to the GPS and/or GLONASS and/or Galileo and/or Beidou location detection systems may be used. As another alternative or additional location detection approach, use may be made of the Mobile Network Code of the cellular network with which the mobile device 208 may be registered.) For further verification, it may be confirmed that the payment account used for the transaction was issued in a country other than Country X; for example, it may be confirmed that the BIN (bank identification number) of the payment account corresponds to a country other than Country X or indicates that the user is employing a traveler's payment account for the transaction.

Figure 4:
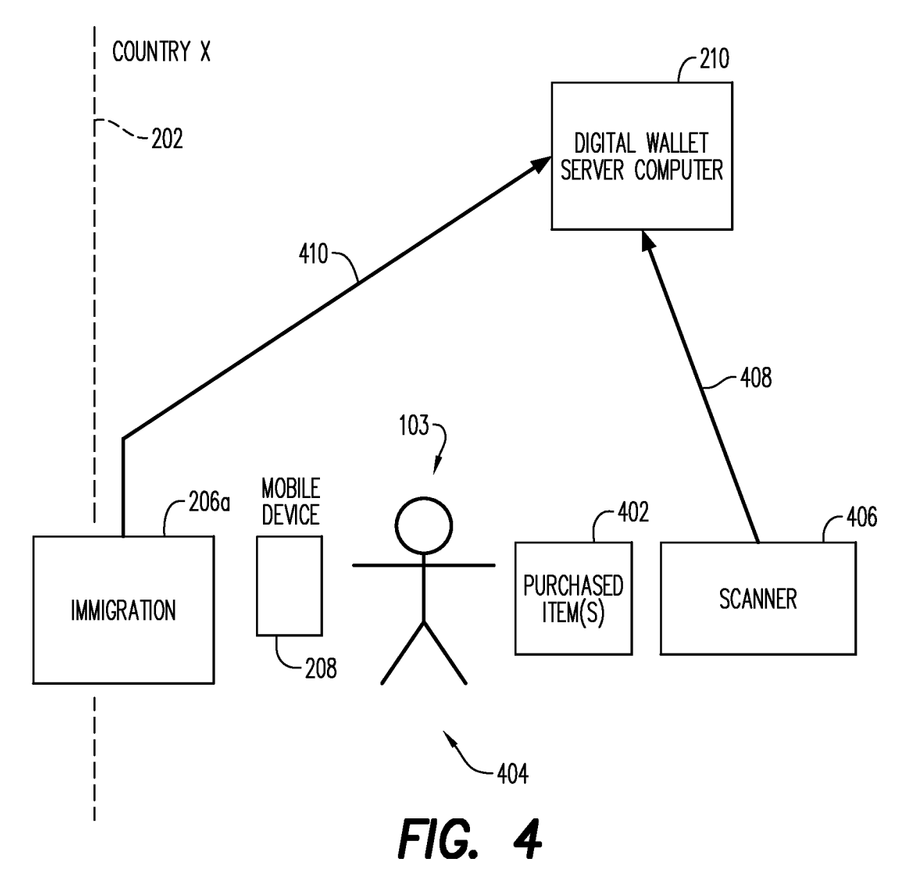
FIG. 4 is a block diagram showing still further aspects of the tax refund system of FIGS. 2 and 3.

FIG. 4 is a block diagram that illustrates still further aspects of the tax refund system 200, as provided according to some embodiments.

The premise of FIG. 4 is that the user 103 is departing from Country X. The user 103 is depicted as taking along with him/her a number of items 402 that the user 103 purchased at retail stores in Country X during purchase transactions such as that illustrated in FIG. 3. The user 103 of course still has his/her payment-enabled smartphone 208 in his/her possession. At the immigration exit checkpoint (generally indicated at 404) a scanner 406 is present to capture identifying data regarding the purchased items that the user 103 is removing from country X. Arrow mark 408 is indicative of the scanner 406 providing the purchased item data to the digital wallet server computer 210. The product identifying data may be obtained by the scanner reading/scanning a barcode or RFID (radio frequency identification) device borne on each purchased item. In some embodiments, the scanner 406 may include computing/communication capabilities that enable it to validate the read item codes against codes logged on the purchase receipt (stored in the digital wallet server computer 210 or presented by the user 103 at the exit checkpoint 404).

There may be interaction (e.g., by short range radio communication) between the smartphone 208 and a terminal (not separately shown) operated by the immigration processing authority 206a. Arrow mark 410 is indicative of the immigration processing authority—in response to the interaction with smartphone 208—indicating to the digital wallet server computer 210 that the user 103 is leaving the country.

Although items 406 and 206a are represented by separate blocks in FIG. 4, in practice those functional components may be at least partially integrated with each other and/or there may be communication and/or coordination therebetween. This may allow for coordination in the provision of information to the digital wallet server computer 210 as separately represented (but not necessarily separate in practice) by arrow marks 408 and 410.

As will be understood from subsequent discussion, the confirmation to the digital wallet server computer 210 of the departure of the user 103 from Country X and the removal of purchased items 402 may trigger the digital wallet server computer 210 to initiate a process to refund to the user 103 the VAT that was charged on the purchased items. According to aspects of the current disclosure, the refund may be via a credit to a payment account owned by the user 103.

To discuss the subject matter of FIGS. 2-4 more generally, it should be understood that in most cases, blocks labeled therein with names/descriptions of entities should also be understood to represent computer systems operated by or for such entities.

It should also be understood that, for at least some types of participants in or components of the tax refund system 200, there may be a considerable or even a very large number of participants or components of those types in practical embodiments of the tax refund system 200.

Figure 5:
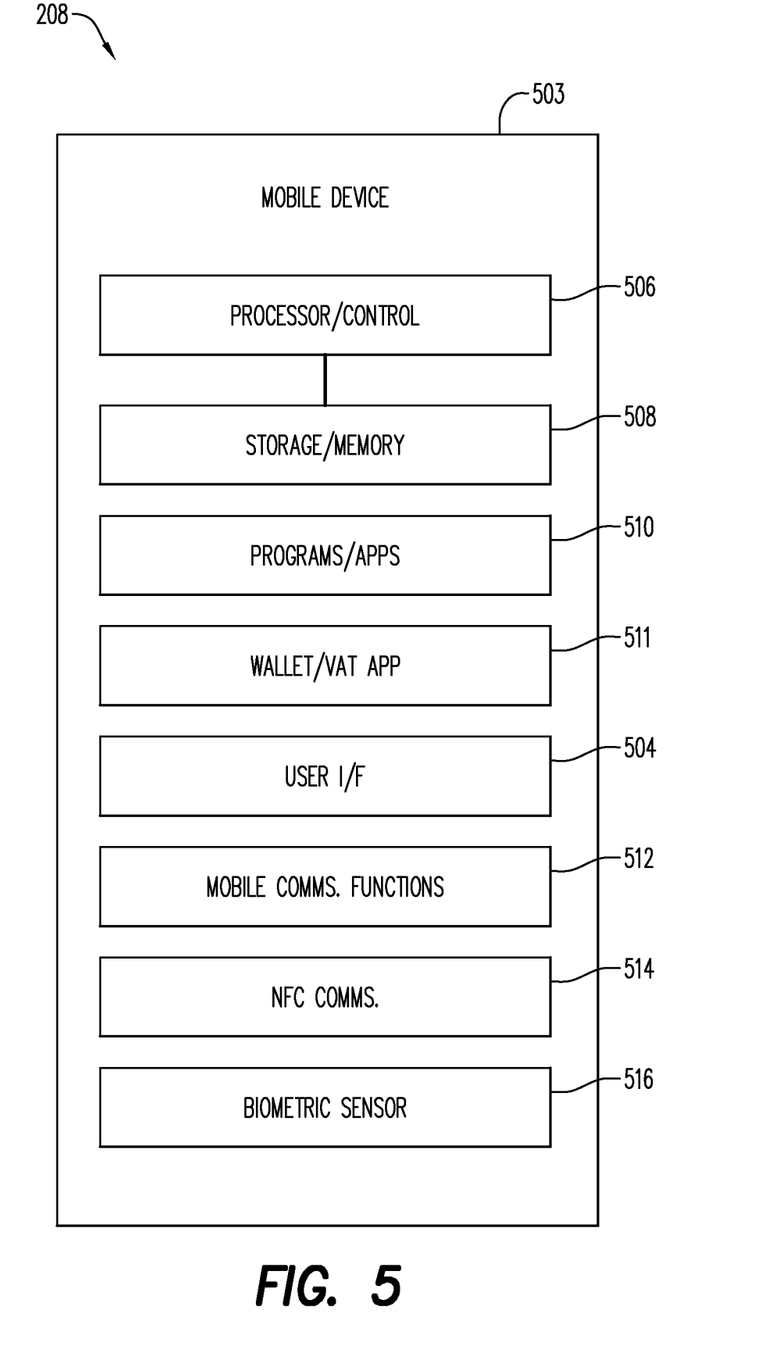
FIG. 5 is a simplified block diagram of a typical smartphone that may be used in connection with the tax refund system of FIGS. 2-4.

FIG. 5 is a simplified block diagram of a typical embodiment of the payment-enabled smartphone 208 that was depicted in FIGS. 2-4.

The smartphone 208 may include a housing 503. In many embodiments, the front of the housing 503 is predominantly constituted by a touchscreen (not separately shown), which is a key element of the user interface 504 of the smartphone 208.

The smartphone 208 further includes a mobile processor/control circuit 506, which is contained within the housing 503. Also included in the smartphone 208 is a storage/memory device or devices (reference numeral 508). The storage/memory devices 508 are in communication with the processor/control circuit 506 and may contain program instructions to control the processor/control circuit 506 to manage and perform various functions of the smartphone 208. As is well-known, a smartphone may function as what is in effect a pocket-sized personal computer, via programming with a number of application programs, or "apps", as well as a mobile operating system (OS). (The apps are represented at block 510 in FIG. 5, and may, along with other programs, in practice be stored in block 508, to program the processor/control circuit 506.)

Also shown in FIG. 5 is a wallet/VAT app 511. The wallet/VAT app 511 is shown apart from the other apps represented at block 510, in part due to the particular relevance of the wallet/VAT app 511 to the subject of this disclosure. In addition, the separate representation of the wallet/VAT app 511 also may be considered to represent the possibility that it is stored in a secured element (SE—not shown apart from block 511 or block 508), which may be provided in some embodiments of the smartphone 208 to provide enhanced security for the wallet/VAT app 511 and/or sensitive data associated therewith. The SE, if present, may be conventional in its hardware aspects. In addition or alternatively, security for the wallet/VAT app 511 may be enhanced by known alternatives to an SE, such as a TEE (trusted execution environment).

To the extent that the SE includes processing capabilities, it may functionally (though likely not physically) overlap with block 506; to the extent that the SE includes storage (and particularly program storage) capabilities, it may functionally (though likely not physically) overlap with block 508.

Details of the functionality of the wallet/VAT app 511 will be described below.

As is typical for smartphones, the smartphone 208 may include mobile communications functions as represented by block 512. The mobile communications functions may include voice and data communications via a mobile communication network (not shown) with which the smartphone 208 is registered.

In addition, to facilitate use as a payment-enabled device, the smartphone 208 may include short-range radio communications capabilities (block 514), including for example NFC (near field communication). Thus block 514 may represent a suitable antenna (not separately shown) that is appropriate for NFC communications as well as driving and receiving circuitry associated with the antenna. It will be appreciated that the NFC antenna may be separate and different from the antenna (not separately shown) utilized by the smartphone 208 for the mobile communication functions represented by block 512.

Also shown in FIG. 5 is a biometric sensor 516, which may be one of the components of the smartphone 208. The biometric sensor 516 may be, for example, a fingerprint sensor, and may operate to assist in verifying the user of the device in connection with transactions to be performed at POS terminals in retail stores, and for other purposes, as will be seen.

From the foregoing discussion, it will be appreciated that the blocks depicted in FIG. 5 as components of the smartphone 208 may in effect overlap with each other, and/or there may be functional connections among the blocks which are not explicitly shown in the drawing. It may also be assumed that, like a typical smartphone, the smartphone 208 may include a rechargeable battery (not shown) that is contained within the housing 503 and that provides electrical power to the active components of the smartphone 208.

Although the user device carried by the user 103 has been referred to herein as a smartphone, in other embodiments, other types of mobile devices with similar capabilities may be used in place of a smartphone.

Figure 6:
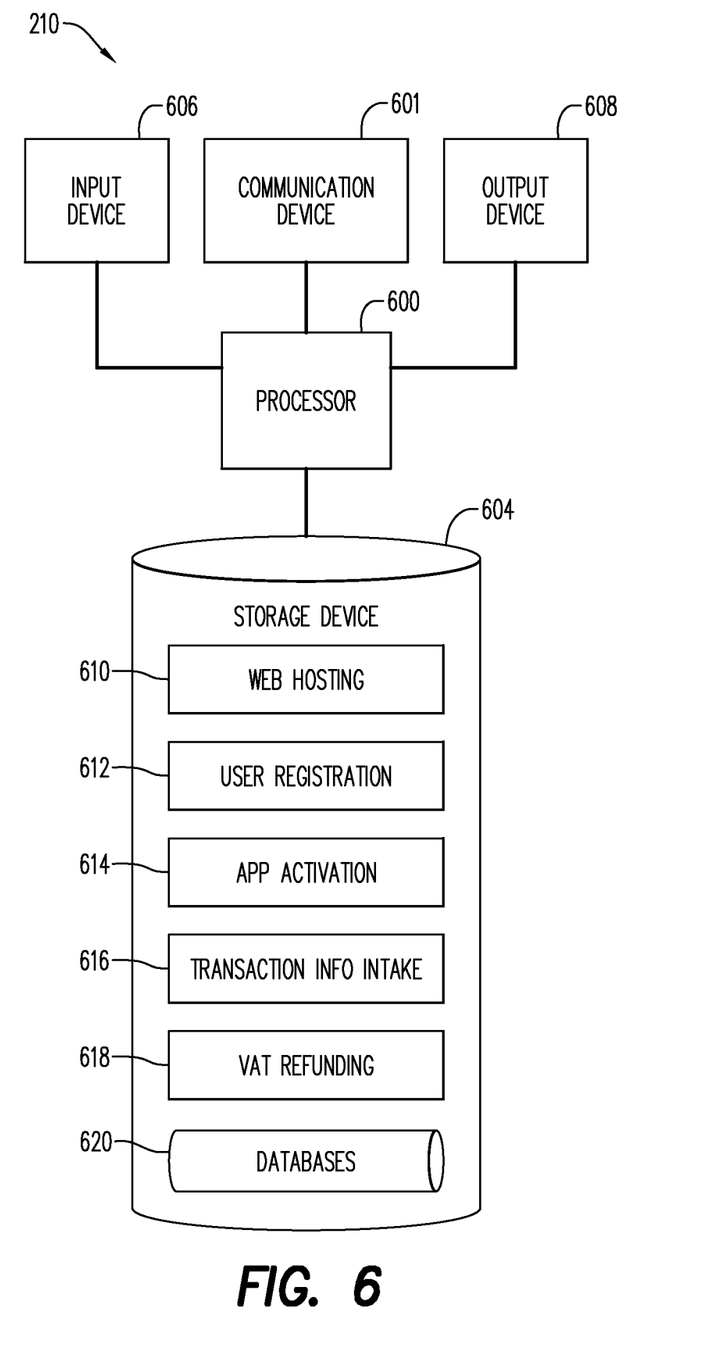
FIG. 6 is a block diagram representation of a digital wallet server computer that may be a component of the tax refund system of FIGS. 2-4.

FIG. 6 is a block diagram representation of an embodiment of the digital wallet server computer 210.

In some embodiments, hardware aspects of the digital wallet server computer 210 may be constituted by typical server computer hardware, but may be controlled by software to cause it to function as described herein.

The digital wallet server computer 210 may include a processor 600 operatively coupled to a communication device 601, a storage device 604, an input device 606 and an output device 608. The communication device 601, the storage device 604, the input device 606 and the output device 608 may all be in communication with the processor 600.

The processor 600 may be constituted by one or more processors. The processor 600 may operate to execute processor-executable steps, contained in program instructions described below, so as to control the digital wallet server computer 210 to provide desired functionality.

Communication device 601 may be used to facilitate communication with, for example, other devices (such as users' smartphones and devices operated by an immigration processing authority). For example, communication device 601 may comprise numerous communication ports (not separately shown), to allow the digital wallet server computer 210 to respond simultaneously to numerous attempts to communicate with the digital wallet server computer 210.

Input device 606 may comprise one or more of any type of peripheral device typically used to input data into a computer. For example, the input device 606 may include a keyboard and a mouse. Output device 608 may comprise, for example, a display and/or a printer.

Storage device 604 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 604 stores one or more programs for controlling processor 600. The programs comprise program instructions (which may be referred to as computer readable program code means) that contain processor-executable process steps of the digital wallet server computer 210, executed by the processor 600 to cause the digital wallet server computer 210 to function as described herein.

The programs may include one or more conventional operating systems (not shown) that control the processor 600 so as to manage and coordinate activities and sharing of resources in the digital wallet server computer 210, and to serve as a host for application programs (described below) that run on the digital wallet server computer 210.

The programs stored in the storage device 604 may also include a web hosting application program 610 that controls the processor 600 to support functionality of the digital wallet server computer 210 to host a website by which users can register with the digital wallet server computer 210, request downloads of the wallet/VAT app to their smartphones, etc.

The storage device 604 may also store a user registration application program 612 that controls the processor 600 to permit the digital wallet server computer 210 to handle user registration requests received via the above-mentioned website.

Further, the storage device 604 may store a wallet app activation software module 614. The wallet app activation software module 614 may control the processor 600 such that the digital wallet server computer 210 provides functionality as described herein in connection with activating wallet/VAT apps when the phones to which the apps have been downloaded enter the country from which the VAT refund is to be received.

Still further, the storage device 604 may store a transaction information intake software module 616. The transaction information intake software module 616 may control the processor 600 such that the digital wallet server computer 210 provides functionality as described herein in connection with receiving information concerning individual purchase transactions in which refundable VAT was charged.

In addition, the storage device 604 may store a VAT refunding software module 618. The VAT refunding software module 618 may control the processor 600 such that the digital wallet server computer 210 provides functionality as described herein in connection with receiving notification that users/visitors have left Country X, and then proceeding to interact with a payment system to credit the users' payment accounts with VAT refunds.

The storage device 604 may also store, and the digital wallet server computer 210 may also execute, other programs, which are not shown. For example, such programs may include a reporting application, which may respond to requests from system administrators for reports on the activities performed by the digital wallet server computer 210. The other programs may also include, e.g., device drivers, database management programs, communications software, etc.

In some embodiments, the storage device 604 may also store one or more databases (reference numeral 620) required for operation of the digital wallet server computer 210.

Other computerized components of the tax refund system 200 may have hardware architectures and/or hardware components like those described above in connection with FIG. 6.

Figure 7:
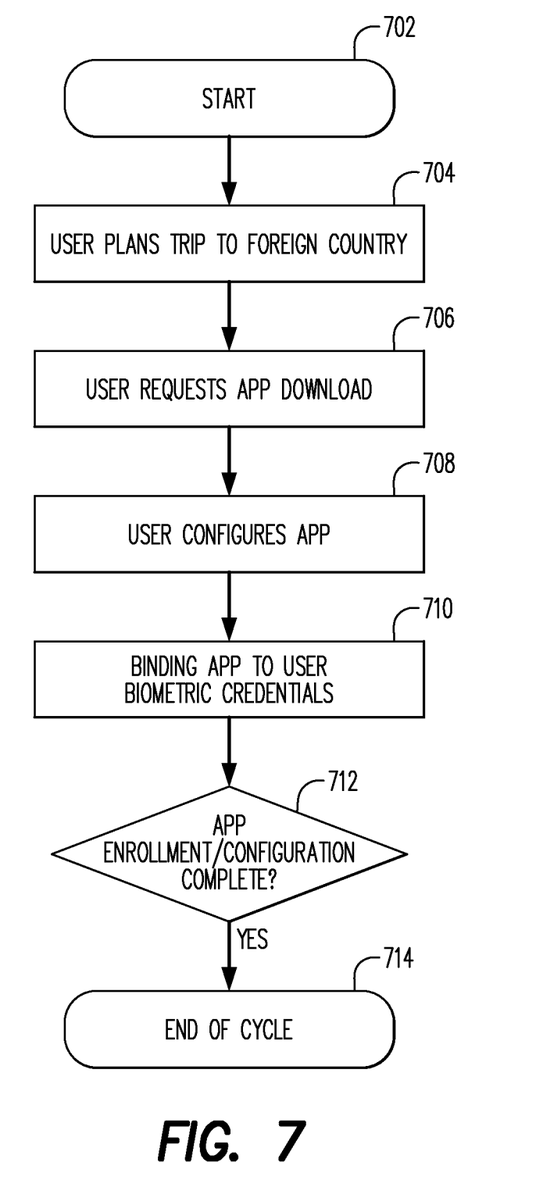
FIGS. 7 and 8 are flow charts that illustrate processes that may be performed in accordance with aspects of the present disclosure in connection with the tax refund system of FIGS. 2-4.

FIG. 7 is a flow chart that illustrates a process that may be performed in connection with the tax refund system 200 in accordance with aspects of the present disclosure. The process of FIG. 7 is particularly concerned with user registration and downloading of the wallet/VAT app 511 to the user's payment-enabled smartphone 208. It may be assumed that the process illustrated in FIG. 7 takes place prior to the border crossing/entry into Country X illustrated in FIG. 2.

The process flow in FIG. 7 starts at 702 and advances to block 704. At block 704, the user 103 plans his/her visit to a foreign country (assumed in this case to be Country X).

At 706 in FIG. 7, the user 103 engages in a user registration/app download process via interaction with the digital wallet server computer 210. The interaction may be via the user's payment-enabled smartphone 208 (e.g., via a mobile browser, not separately shown). In some embodiments, the digital wallet server computer 210 may be operated directly by a governmental agency/authority of Country X. In other embodiments, the digital wallet server computer 210 may be operated by, e.g., a payment network operator that has a cooperative/trusted relationship with a governmental agency/authority of Country X. In still other use cases, the wallet/VAT app may be available for download from the account issuer of one of the user's payment accounts. (For example, the user's account issuer may issue a special payment account for use during the user's visit to Country X.)

In any event, the user 103 may access a website hosted by the digital wallet server computer 210 and may register therewith (if not already so registered). Registration may require the user to enter information such as the user's name, contact information and visa and/or passport number.

At 708 in FIG. 7, the user 103 may configure the wallet/VAT app 511. The configuration process may include loading the user's travel visa/passport information into the wallet/VAT app 511. The configuration process may further include loading or associating with the wallet/VAT app 511 payment credentials or other information related to the user's payment accounts that the user 103 is electing to be accessible via the wallet/VAT app 511. In some embodiments, issuer permission must be obtained and an ID&V (identification and verification) process must be performed relative to the user 103 before the payment account information is permitted to be loaded into or associated with the wallet/VAT app 511.

At 710 in FIG. 7, the user's biometric credentials (e.g., the user's fingerprint/thumbprint or characteristic features thereof) may be bound to the wallet/VAT app 511. The purpose of this process step may be to restrict access to the wallet/VAT app 511 such that the wallet/VAT app 511 cannot be accessed without a biometric user authentication having been successfully performed. In some embodiments, the user's biometric credentials may be obtained via a government identification database. In addition or alternatively, a service provider (e.g., as affiliate of a payment network operator), an account issuer or an agency of Country X may be the source of the user's biometric credentials.

At decision block 712 in FIG. 7, it is determined whether enrollment/installation and/or configuring of the wallet/VAT app 511 are complete. If so, then the registration process of FIG. 7 ends, as indicated at 714.

Figure 8:
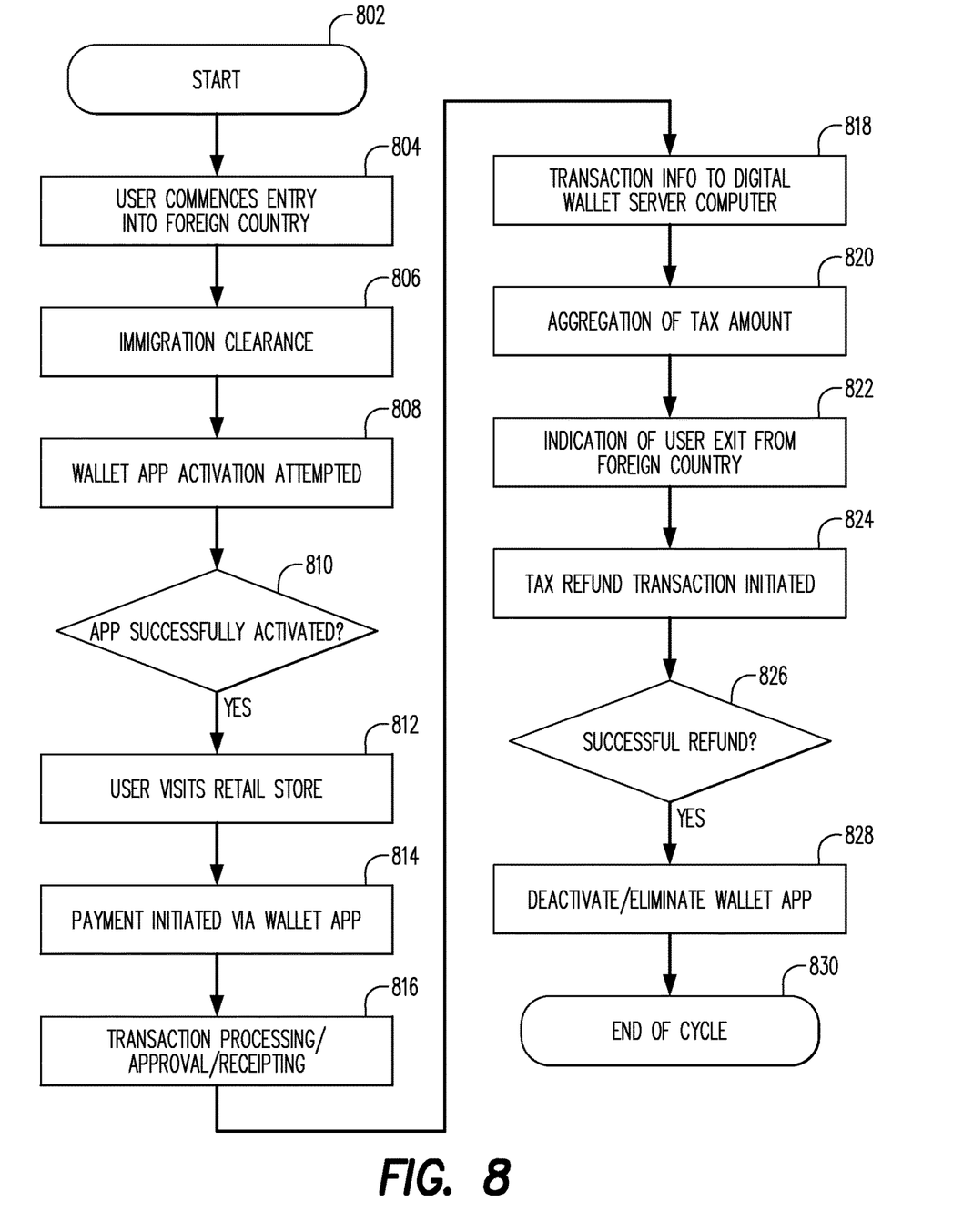

FIG. 8 is a flow chart that illustrates a process that may be performed in connection with the tax refund system 200 in accordance with aspects of the present disclosure. The process of FIG. 8 is particularly concerned with activation and use of the wallet/VAT app 511 in connection with the user's visit to Country X, as referred to above.

The process flow in FIG. 8 starts at 802 and advances to block 804. At 804, the user 103 commences entry into Country X by engaging with the immigration processing authority 206, as depicted in FIG. 2. As part of doing so, the user 103 may present his/her passport and/or visa. As part of the immigration processing, the user may also cause his/her payment-enabled smartphone 208 and its wallet/VAT app 511 to identify themselves to a terminal (not separately shown) operated by the immigration processing authority 206.

In some embodiments, the digital wallet server computer 210 may cooperate with the immigration processing authority 206 to aid the immigration processing authority 206 in determining whether to clear the user 103 to enter Country X. For example, the immigration processing authority 206 may send a message to the digital wallet server computer 210 indicating that the user 103 (carrying payment-enabled smartphone 208) is seeking entry. The digital wallet server computer 210 may transmit a challenge to the payment-enabled smartphone 208 to require the user 103 to submit a biometric sample (e.g., a fingerprint scan) to the wallet/VAT app 511. The user 103 may do so to allow for user authentication to the wallet/VAT app 511. Assuming the user authentication is successful, the wallet/VAT app 511 may notify the digital wallet server computer 210, which may in turn notify the immigration processing authority 206.

In some embodiments, some process steps described above in connection with FIG. 7 may instead occur as part of the processing of block 804. For example, user enrollment records may be bound to the user at that time either through a government sponsored application program or through the user's account issuer in cooperation with the government and/or the payment system operator to access biometric authentication data for the user. The user may be given an option to participate in the immigration entry program via his/her smartphone 208 or via a standard entry procedure. At the time of the user's entry into Country X, the immigration officer (not shown) may pass/scan the user's passport details via a reader. The government data processing system (e.g., block 206 in FIG. 2) may check the user's eligibility and selection of opt-in, resulting in issuance of a challenge to the smartphone 208. The government/issuer/system operator authentication system may pass the challenge to the user device. The resulting submission of the user's biometric characteristic via the smartphone 208 may be verified, together with the geo-ip location of the smartphone 208, to indicate that ensuing purchase transactions by the user may be cross-border transactions potentially eligible for VAT refund.

Referring again to FIG. 8, at 806 the user 103 clears the immigration control point and enters Country X. At essentially the same time, as indicated at 808, activation of the wallet/VAT app 511 on the payment-enabled smartphone 208 may be initiated. For example, the immigration processing authority 206 may push a notification to the digital wallet server computer 210 to indicate that the user 103, the payment-enabled smartphone 208 and the wallet/VAT app 511 have entered country X. Alternatively, Geo-IP location data for the payment-enabled smartphone 208 may be provided to the digital wallet server computer 210 to indicate entry of the user 103, the payment-enabled smartphone 208 and the wallet/VAT app 511 into Country X. In response, the digital wallet server computer 210 may transmit a suitable signal to the payment-enabled smartphone 208 to cause activation of the wallet/VAT app 511.

At decision block 810, it is determined whether activation of the wallet/VAT app 511 has successfully taken place. If so, the payment-enabled smartphone 208 and the wallet/VAT app 511 are ready for use in purchase transactions, as indicated in process steps indicated in FIG. 8 as following decision block 810.

Moving ahead to block 812 in FIG. 8, reference is also made to FIG. 3, which illustrates the user 103 visiting a retail store and engaging in a purchase transaction. It can be assumed that the user 103 has selected one or more items to purchase and approached the checkout counter (not separately shown), where the proximity reader 104a (FIG. 3) and the POS terminal 106a are located. In an essentially conventional fashion the user 103 may access the wallet/VAT app 511 on the payment-enabled smartphone 208 (e.g., with fingerprint verification) and may select an account from the wallet/VAT app 511 for use in the transaction. At indicated at block 814 in FIG. 8, the user 103 may present the payment-enabled smartphone 208 to the proximity reader 104a so that the wallet/VAT app 511 can initiate a payment account transaction, including transfer of payment credentials to the merchant. (The payment credentials may include, for example, a payment account number or payment token and may be transmitted from the payment-enabled smartphone 208 to the POS terminal 106a or downloaded from a token service, which in some embodiments may be implemented via the digital wallet server computer 210.)

At block 816, generation and processing of a transaction authorization request message by the merchant, routing of the same to the account issuer 112, approval of the transaction by the account issuer 112, and routing of the issuer's transaction authorization response message may all occur in an essentially conventional manner. Further, the POS terminal 106a, via the proximity reader 104a, may transmit an electronic receipt for the transaction to the wallet/VAT app 511 on the payment-enabled smartphone 208.

At block 818, the wallet/VAT app 511/payment-enabled smartphone 208 may transmit the electronic receipt or portions thereof to the digital wallet server computer 210. At 820, the digital wallet server computer 210 may receive the transaction information from the payment-enabled smartphone 208/wallet/VAT app 511; it may be assumed that the digital wallet server computer 210 may detect the amount of VAT charged in the current transaction, and that over the course of the user's visit to Country X the digital wallet server computer 210 may collect and aggregate the transaction information it receives from the payment-enabled smartphone 208 over a number of purchase transactions in Country X. Thus the digital wallet server computer 210 may generate an aggregate amount of VAT that the user 103 has paid during his/her visit to Country X. When the digital wallet server computer 210 receives the transaction information, an indication may be included in the transaction information to the effect that a user authentication such as a biometric user authentication occurred in connection with the payment account transaction.

Moving onward from block 820, at block 822 the digital wallet server computer 210 receives an indication or notification that the user 103 is leaving or has left Country X. For example, such an indication/notification may occur via a scenario like that illustrated in FIG. 4, wherein the user's outward passage through the immigration processing authority 206a is noted by a suitable electronic device, which provides the indication/notification to the digital wallet server computer 210. In other embodiments, an updated geo-location for the payment-enabled smartphone 208 is reported to the digital wallet server computer 210 and indicates that the payment-enabled smartphone 208 is no longer within Country X.

At 824, and in response to the indication received at 822, the digital wallet server computer 210 may initiate a payment account system transaction to refund the VAT charged to the user 103 during his/her visit to Country X. The payment account system transaction may result in a crediting of the amount of the refund to a payment account that belongs to the user 103. For example, the payment account in question may be one that has been associated with the wallet/VAT app 511. In some embodiments, initiating of the VAT refunding transaction also requires the user to make a request for the refund to the digital wallet server computer 210 via the wallet/VAT app 511. In some embodiments, initiating of the VAT refund may require that the user 103 sync the wallet/VAT app 511 to a PC or kiosk to print out a paper VAT refund receipt to present to a refund authority. The paper receipt may in some embodiments be secured with an encoded QR code or the like.

At decision block 826, it is determined whether the refunding transaction has successfully taken place. If so, block 828 may follow. At block 828, the digital wallet server computer 210 may communicate with the payment-enabled smartphone 208 to cause the wallet/VAT app 511 to be deactivated or uninstalled from the payment-enabled smartphone 208. If the wallet/VAT app 511 is only deactivated but not disinstalled, then it may be reactivated on the user's next visit to Country X. As an alternative, the VAT refund due balance may be reset to zero with respect to the wallet/VAT app 511.

After block 828, the processing cycle of FIG. 8 may end, as indicated at 830.

With a VAT refund system as described herein, tracking VAT-bearing purchases and refunding the total VAT to travelers may be highly automated, while also exhibiting robust security with use of a VAT-dedicated mobile wallet app accessible only through user authentication.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable, including simultaneous performance of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method of operating a digital wallet server computer, said computer configured to communicate with digital wallet application programs running in payment-enabled mobile devices, the method comprising:
   detecting by the digital wallet server computer that one of said payment-enabled mobile devices has been transported into a foreign country that is different from a home country of a user of said one of said payment-enabled mobile devices, said one of said payment-enabled mobile devices running a respective one of said digital wallet application programs;
   receiving transaction information concerning at least one payment account transaction performed in said foreign country using said respective one of said digital wallet application programs;
   calculating a total amount of taxes paid in said at least one payment account transaction performed in said foreign country;
   receiving an indication that said user is departing or has departed from said foreign country; and
   in response to said indication, refunding said calculated total amount of taxes to a payment account associated with said respective one of said digital wallet application programs;
   wherein the detecting step includes the digital wallet server computer receiving a notification by an immigration processing authority of said foreign country, said notification indicating entry of said user into said foreign country;
   the method further comprising:
   activating said respective one of said digital wallet application programs in response to said notification.

2. The method of claim 1, wherein said respective one of said digital wallet application programs was downloaded to said one of said payment-enabled mobile devices from a governmental authority of said foreign country.

3. The method of claim 1, wherein said respective one of said digital wallet application programs was downloaded to said one of said payment-enabled mobile devices from a payment account issuer or wallet service provider, said payment account issuer or wallet service provider in cooperation with a governmental authority of said foreign country.

4. The method of claim 1, wherein the received transaction information includes at least one indication that biometric user authentication occurred with respect to said at least one payment account transaction.

5. The method of claim 1, wherein the digital wallet server computer receives a notification by the immigration processing authority of said foreign country that said user is requesting entry into the foreign country;
   the method further comprising:
   sending a biometric challenge to said one of said payment-enabled mobile devices;
   receiving a biometric submission via said one of said payment-enabled mobile devices in response to said biometric challenge; and
   transmitting from the digital wallet server computer to the immigration processing authority a notification that said user has been authenticated by said one of said payment-enabled mobile devices.

6. A digital wallet server computer configured to communicate with digital wallet application programs running on payment-enabled mobile devices, the digital wallet server computer comprising:
   a processor; and
   a memory in communication with said processor, the memory storing program instructions, the processor operative with the program instructions to perform functions as follows:
   detecting by the digital wallet server computer that one of said payment-enabled mobile devices has been transported into a foreign country that is different from a home country of a user of said one of said payment-enabled mobile devices, said one of said payment-enabled mobile devices running a respective one of said digital wallet application programs;
   receiving transaction information concerning at least one payment account transaction performed in said foreign country using said respective one of said digital wallet application programs;
   calculating a total amount of taxes paid in said at least one payment account transaction performed in said foreign country;
   receiving an indication that said user is departing or has departed from said foreign country; and
   in response to said indication, refunding said calculated total amount of taxes to a payment account associated with said respective one of said digital wallet application programs;
   wherein the detecting function includes the digital wallet server computer receiving a notification by an immigration processing authority of said foreign country, said notification indicating entry of said user into said foreign country;
   the processor further operative with the program instructions to activate said respective one of said digital wallet application programs in response to said notification.

7. The apparatus of claim 6, wherein said respective one of said digital wallet application programs was downloaded to said one of said payment-enabled mobile devices from a governmental authority of said foreign country.

8. The apparatus of claim 6, wherein said respective one of said digital wallet application programs was downloaded to said one of said payment-enabled mobile devices from a payment account issuer or wallet service provider, said payment account issuer or wallet service provider in cooperation with a governmental authority of said foreign country.

9. The apparatus of claim 6, wherein the received transaction information includes at least one indication that biometric user authentication occurred with respect to said at least one payment account transaction.

* * * * *